United States Patent
Gumpoltsberger et al.

(10) Patent No.: US 8,444,525 B2
(45) Date of Patent: *May 21, 2013

(54) MULTI-RATIO TRANSMISSION

(75) Inventors: Gerhard Gumpoltsberger, Friedrichshafen (DE); Christian Sibla, Friedrichshafen (DE); Stefan Beck, Eriskirch (DE); Josef Haupt, Tettnang (DE); Gert Bauknecht, Friedrichshafen (DE); Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/384,624

(22) PCT Filed: Aug. 19, 2010

(86) PCT No.: PCT/EP2010/062121
§ 371 (c)(1),
(2), (4) Date: Jan. 18, 2012

(87) PCT Pub. No.: WO2011/020889
PCT Pub. Date: Feb. 24, 2011

(65) Prior Publication Data
US 2012/0149526 A1    Jun. 14, 2012

(30) Foreign Application Priority Data
Aug. 20, 2009   (DE) .................. 10 2009 028 668

(51) Int. Cl.
*F16H 3/44* (2006.01)
(52) U.S. Cl.
USPC .......................................... 475/280; 475/330
(58) Field of Classification Search
USPC .................. 475/269, 271, 275, 276, 280, 296, 475/330
See application file for complete search history.

(56) References Cited

U.S. PATENT DOCUMENTS

| 4,038,888 A * | 8/1977 | Murakami et al. ............ 475/276 |
| 4,683,776 A | 8/1987 | Klemen |
| 6,558,287 B2 | 5/2003 | Hayabuchi et al. |
| 6,634,980 B1 | 10/2003 | Ziemer |

(Continued)

FOREIGN PATENT DOCUMENTS

| DE | 26 36 969 A1 | 2/1978 |
| DE | 199 49 507 A1 | 4/2001 |

(Continued)

OTHER PUBLICATIONS

Gumpoltsberger, Gerhard: Systematic Synthesis and Evaluation of Multi-Stage Planetary Transmissions, Dissertation TU Chemnitz, 2007, pp. 1-210.

(Continued)

*Primary Examiner* — Justin Holmes
(74) *Attorney, Agent, or Firm* — Davis & Bujold, PLLC

(57) ABSTRACT

A transmission comprising four planetary gear sets, eight shafts and six shift elements. The sun gear of gear set (P1) is fixed via brake (04), the carrier of gear set (P1) is fixed via brake (03) and the drive via clutch (13), and shaft (6) via clutch (36). Sixth shaft (6) is connected to the ring gear of gear set (P2) and the sun gear of gear set (P4), the drive is connected to the sun gear of gear set (P2) and is connectable to the carrier of gear set (P3). Seventh shaft (7) is connected to the ring gear of gear set (P1) and the carrier of gear set (P2), and is connectable to the sun gear of gear set (P3). The ring gear of the fourth gear set (P4) is connectable to the housing via brake (05). The output is connected to the ring gear of third gear set (P3) and the carrier of fourth gear set (P4).

6 Claims, 2 Drawing Sheets

U.S. PATENT DOCUMENTS

| | | | |
|---|---|---|---|
| 6,960,149 B2 | 11/2005 | Ziemer | |
| 7,549,942 B2 | 6/2009 | Gumpoltsberger | |
| 7,699,743 B2 | 4/2010 | Diosi et al. | |
| 8,197,376 B2 * | 6/2012 | Gumpoltsberger et al. | .. 475/280 |
| 8,241,170 B2 * | 8/2012 | Gumpoltsberger et al. | .. 475/284 |
| 2008/0261756 A1 | 10/2008 | Carey et al. | |
| 2009/0048059 A1 | 2/2009 | Phillips et al. | |
| 2012/0115672 A1 * | 5/2012 | Gumpoltsberger et al. | .. 475/276 |
| 2012/0122626 A1 * | 5/2012 | Gumpoltsberger et al. | .. 475/276 |
| 2012/0135834 A1 * | 5/2012 | Gumpoltsberger et al. | .. 475/276 |

FOREIGN PATENT DOCUMENTS

| | | |
|---|---|---|
| DE | 101 15 995 A1 | 10/2002 |
| DE | 102 13 820 A1 | 10/2002 |
| DE | 10 2005 010 210 A1 | 9/2006 |
| DE | 10 2006 006 637 A1 | 9/2007 |
| DE | 10 2008 016 084 A1 | 10/2008 |
| DE | 10 2008 000 428 A1 | 9/2009 |
| JP | 2005 036955 A | 2/2005 |
| JP | 2006-349153 A | 12/2006 |
| WO | 2009/106408 A1 | 9/2009 |

OTHER PUBLICATIONS

Gumpoltsberger, Gerhard: Synthesis of Planetary Transmissions, ZF Friedrichshafen AG, 2009, 13 Pages, Germany.

* cited by examiner

|  | 03 | 04 | 05 | 13 | 18 | 36 | i | phi |
|---|---|---|---|---|---|---|---|---|
| 1. GEAR |  | X | X |  |  | X | 5.531 | 1.713 |
| 2. GEAR |  |  | X | X |  | X | 3.228 | 1.446 |
| 3. GEAR |  | X | X | X |  |  | 2.232 | 1.379 |
| 4. GEAR |  |  | X | X | X |  | 1.619 | 1.341 |
| 5. GEAR |  | X |  | X | X |  | 1.207 | 1.207 |
| 6. GEAR |  |  |  | X | X | X | 1.000 | 1.160 |
| 7. GEAR |  | X |  |  | X | X | 0.862 | 1.193 |
| 8. GEAR | X |  |  |  | X | X | 0.722 | 1.174 |
| 9. GEAR | X | X |  |  | X |  | 0.615 | 8.988 |
| R GEAR | X | X | X |  |  |  | −5.165 | −0.934 |

Fig. 3

MULTI-RATIO TRANSMISSION

This application is a National Stage completion of PCT/EP2010/062121 filed Aug. 19, 2010, which claims priority from German patent application serial no. 10 2009 028 668.3 filed Aug. 20, 2009.

FIELD OF THE INVENTION

The present invention relates to a multi-step transmission of a planetary design, in particular an automatic transmission for a motor vehicle.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Such an automatic transmission is known, for example, from the applicant's patent DE 199 49 507 A1, according to which two non-shiftable front-mounted gear sets are provided on the drive shaft and generate two rotational speeds on the output side, which, in addition to the rotational speed of the drive shaft, can be selectively meshed with a shiftable double planetary gear set acting on the output shaft by selective engagement of the shift elements such that only one of the two currently actuated shift elements must be engaged or disengaged to shift from one gear to the next higher or lower gear.

By using five shift elements, seven forward gears are obtained; by using six shift elements, nine or ten forward gears are obtained.

Furthermore, patent DE 102 13 820 A1 makes known a multi-speed automatic transmission with eight forward gears and one reverse gear, which comprises a first input path T1 of a first transmission ratio; an input path T2 that has a higher transmission ratio than that of input path T1; a Ravigneaux type planetary gear set with four elements, namely, a first element, a second element, a third element and a fourth element in the sequence of elements in a rotational speed diagram; a clutch C-2 which transfers rotation of the input path T2 to the first element S3; a clutch C-1, which transfers rotation from the input path T2 to the fourth element S2; a clutch C-4, which transfers rotation from the input path T1 to the first element; a clutch C-3, which transfers rotation from the input path T1 to the second element C3; a brake B-1, which produces meshing of the fourth element; a brake B-2, which produces meshing of the second element; and an output element that is coupled to the third element S3.

Furthermore, a nine-speed multi-step transmission is known from DE 29 36 969 A1; it comprises eight shift elements and four gear sets, wherein one gear set serves as a front-mounted gear set and the main gearing includes a Simpson set and a further gear set serving as reverse gearing.

Further multi-step transmissions are known, for example, from the applicant's patents DE 102005010210 A1 and DE 102006006637 A1.

Automatically shiftable vehicle transmissions, of the planetary design, are already generally described numerous times in the prior art and are continually undergoing further development and improvement. These transmissions should have a relatively simple design, in particular requiring a low number of shift elements, and minimize the need for double shifting when sequential shifting is performed, thereby ensuring that only one shift element is ever switched when shifting is performed in defined groups of gears.

The applicant's document, DE 102008000428.3 which is not yet published, discloses a multi-step transmission of a planetary design that includes an input shaft and an output shaft which are disposed in a housing. The known transmission includes at least four planetary gear sets which are designated, in the following, as the first, second, third, and fourth planetary gear set, at least eight rotatable shafts which are designated in the following as the drive shaft, output shaft, third, fourth, fifth, sixth, seventh, and eighth shaft, and at least six shift elements comprising brakes and clutches, whose selected engagement produces different transmission ratios between the input shaft and the output shaft, and therefore preferably nine forward gears and one reverse gear can be realized.

The first and second planetary gear sets, which are preferably designed as minus planetary gear sets, form a shiftable front-mounted gear set, wherein the third and fourth planetary gear sets form a main gear set.

In the known multi-step transmission, the carriers of the first and second planetary gear sets are coupled together via the fourth shaft which is connected to an element of the main gear set, the ring gear of the first planetary gear set is coupled to the sun gear of the second planetary gear set via the eighth shaft, which is detachably connectable to the drive shaft via the first clutch, and the sun gear of the first planetary gear set can be coupled to a housing of the transmission by means of the third shaft, via a first brake, and is detachably connectable to the drive shaft via a second clutch, wherein the ring gear of the second planetary gear set can be coupled to a housing of the transmission by means of the fifth shaft via a second brake. In addition, the seventh shaft is constantly connected to at least one element of the main gear set, and can be coupled to a housing of the transmission via a third brake, wherein the sixth shaft is constantly connected to at least one further element of the main gear set and is detachably connectable to the drive shaft, via a third clutch; the output shaft is constantly connected at least to one further element of the main gear set.

In the known transmission, the fourth shaft is preferably constantly connected to the ring gear of the third planetary gear set, wherein the sixth shaft is constantly connected to the ring gear of the fourth planetary gear set and to the carrier of the third planetary gear set, and is detachably connectable to the drive shaft via the third clutch. Furthermore, the seventh shaft is constantly connected to the sun gears of the third and fourth planetary gear sets, and can be coupled to a housing of the transmission via the third brake. In this case, the output drive is produced via the output shaft that is constantly connected to the carrier of the fourth planetary gear set. Furthermore, the third and fourth planetary gear sets can be combined or reduced to a Ravigneaux set having a common carrier and a common ring gear.

SUMMARY OF THE INVENTION

The object of the present invention is to propose a multi-step transmission of the initially described type, which has nine forward gears and at least one reverse gear having a sufficient transmission ratio, in which the design complexity and the overall size, in particular the overall length and the weight, are optimized, and in which efficiency is improved with respect to drag losses and gearing losses. In addition, in the multi-step transmission according to the invention, minimal support moments should act on the shift elements. The transmission, according to the invention, should be particularly suited for a front transverse installation.

Accordingly, a multi-step transmission, according to the invention, of a planetary design is proposed which has an input shaft and an output shaft which are disposed in a housing. In addition, there are provided at least four planetary gear sets which are designated, in the following, as the first, second, third, and fourth planetary gear set, eight rotatable shafts which are designated, in the following, as the drive shaft, output shaft, third, fourth, fifth, sixth, seventh, and eighth shaft, and at least six shift elements comprising brakes and clutches, whose selected engagement produces different transmission ratios between the drive shaft and the output shaft, and therefore preferably nine forward gears and one reverse gear can be realized.

The planetary gear sets, viewed axially, are disposed in the sequence of first planetary gear set, second planetary gear set, third planetary gear set, fourth planetary gear set, and are preferably designed as minus planetary gear sets.

As is well known, a simple minus planetary gear set comprises a sun gear, a ring gear, and a carrier on which the planetary gears are rotatably supported, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear and a carrier, on which inner and outer planet gears are rotatably supported, wherein all inner planet gears mesh with the sun gear and all outer planet gears mesh with the ring gear, wherein each inner planet gear meshes with only one outer planet gear. As a result, when the carrier is fixed, the ring gear has the same direction of rotation as the sun gear.

According to the invention, the sun gear of the first planetary gear set is connected to the fourth shaft which can be coupled to a housing of the transmission via a first brake, wherein the carrier of the first planetary gear set is connected to the third shaft which can be coupled to a housing of the transmission via a second brake, and is detachably connectable to the drive shaft, via a first clutch, and to the sixth shaft via a second clutch, wherein the sixth shaft is connected to the ring gear of the second planetary gear set and to the sun gear of the fourth planetary gear set, and the drive shaft is connected to the sun gear of second planetary gear set and is operatively connected to the carrier of the third planetary gear set.

Furthermore, the ring gear of the first planetary gear set is connected to the seventh shaft which is connected to the carrier of the second planetary gear set and is operatively connected to the sun gear up the third planetary gear set, wherein the ring gear of the fourth planetary gear set can be coupled to a housing of the transmission via a third brake, and wherein the output shaft is connected to the ring gear of the third planetary gear set and to the carrier of the fourth planetary gear set.

The drive shaft is preferably detachably connectable to the carrier of the third planetary gear set via an eighth shaft, which is connected to the carrier of the third planetary gear set, and via a third clutch detachably connecting the eighth shaft to the drive shaft, wherein the seventh shaft is directly connected to the sun gear of the third planetary gear set.

According to a further embodiment of the invention it is provided that the drive shaft is directly connected to the carrier of the third planetary gear set, wherein the seventh shaft is not directly connected to the sun gear of the third planetary gear set, but rather is detachably connectable via a further shaft, which is connected to the sun gear of the third planetary gear set, and via a further clutch detachably connecting the further shaft to the seventh shaft.

The embodiment of the multi-step transmission, according to the invention, results in transmission ratios that are particularly suitable for passenger vehicles, and in a greater overall gear ratio of the multi-step transmission, thereby improving driving smoothness and significantly reducing fuel consumption.

Furthermore, design complexity is significantly reduced with the multi-step transmission, according to the invention, due to a low number of shift elements. Using the multi-step transmission according to the invention, it is advantageously possible to perform a start-up using a hydrodynamic converter, an external start-up clutch, or any other suitable external start-up element. It is also conceivable to perform start-up using a start-up element integrated in the transmission. Preferably, a shift element that is actuated in the first forward gear and in the reverse gear is suitable.

Moreover, the multi-step transmission, according to the invention, results in good efficiency in the main drive gears with respect to drag losses and gearing losses.

Furthermore, low moments are present in the shift elements and in the planetary gear sets of the multi-step transmission, thereby advantageously reducing wear in the multi-step transmission. In addition, the low moments make it possible to utilize correspondingly low dimensions, thereby reducing the necessary installation space and related costs. Furthermore, the rotational speeds of the shafts, shift elements, and planetary gear sets are low.

In addition, the transmission, according to the invention, is designed to allow adaptability to different drive train embodiments in terms of power flow direction and spatial aspects.

BRIEF DESCRIPTION OF THE DRAWINGS

The invention is described in greater detail in the following, as an example, with reference to the attached figures. They show:

FIG. 3: an example of a shift pattern for a multi-step transmission according to FIG. 1.

DETAILED DESCRIPTION OF THE PREFERRED EMBODIMENTS

Figure 1:
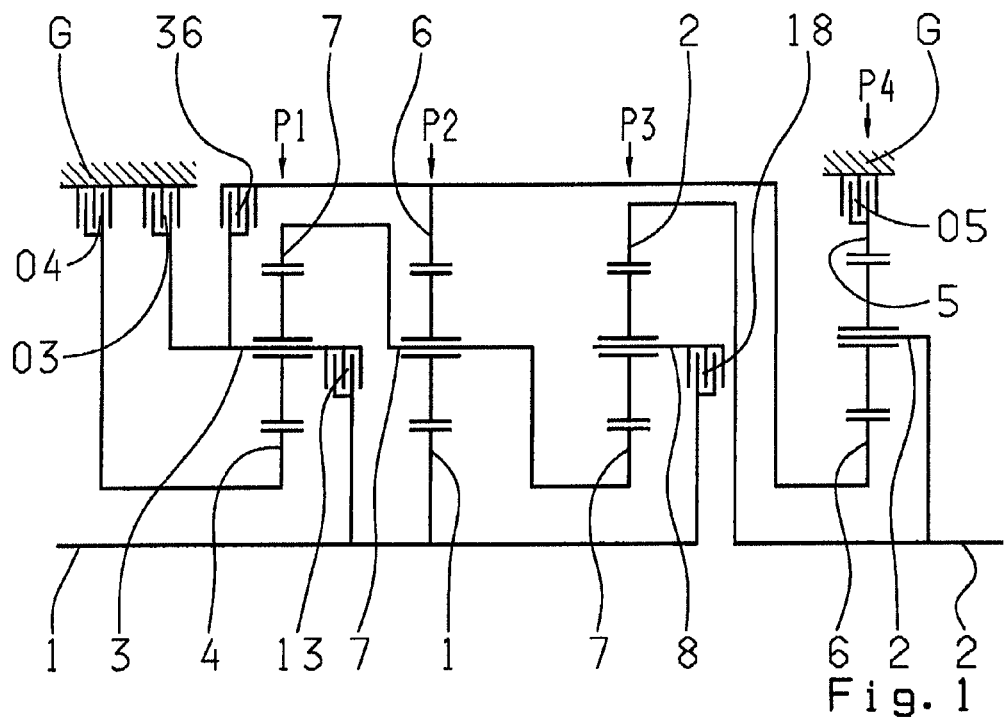
FIG. 1: a schematic view of a first preferred embodiment of a multi-step transmission according to the invention.

FIG. 1 shows a multi-step transmission, according to the invention, which has a drive shaft 1, an output shaft 2, and four planetary gear sets P1, P2, P3 and P4 which are disposed in a housing G. Planetary gear sets P1, P2, P3 and P4, in the example shown in FIG. 1, are designed as minus planetary gear sets. According to the invention, at least one planetary gear set can be implemented as a plus planetary gear set if the carrier and ring gear connection are exchanged and, simultaneously, the value of the stationary transmission ratio is increased by 1 in comparison to the embodiment as a minus planetary gear set.

In the embodiment shown, the planetary gear sets, viewed axially, are disposed in the sequence P1, P2, P3 and P4.

As shown in FIG. 1, six shift elements are provided, namely, three brakes, 03, 04, 05 and three clutches 13, 36, and 18. The spatial disposition of the shift elements can be arbitrary, and is limited only by the dimensions of the outer design. The clutches and the brakes of the transmission are preferably implemented as friction shift elements or lamellar shift elements.

Selective shifting of nine forward gears and one reverse gear can be realized using these shift elements. The multi-step transmission, according to the invention, has a total of eight rotatable shafts, namely, the shafts 1, 2, 3, 4, 5, 6, 7 and 8, wherein the drive shaft is the first shaft, and the output shaft is the second shaft of the transmission.

According to the invention, in the multi-step transmission according to FIG. 1 it is provided that the sun gear of the first planetary gear set P1 is connected to the fourth shaft 4 which can be coupled to a housing G of the transmission via a first brake 04, wherein the carrier of the first planetary gear set P1 is connected to the third shaft 3 which can be coupled to a housing G of the transmission via the second brake 03, and is detachably connectable to the drive shaft via a first clutch 13, and to the sixth shaft 6 via a second clutch 36.

As shown in FIG. 1, the sixth shaft 6 is connected to the ring gear of the second planetary gear set P2 and to the sun gear of the fourth planetary gear set P4, wherein the drive shaft 1 is connected to the sun gear of the second planetary gear set P2, and is detachably connectable to the carrier of the third planetary gear set P3 via a third clutch 18 and the eighth shaft 8.

According to the invention, the ring gear of the first planetary gear set P1 is connected to the seventh shaft 7 which is directly connected to the carrier of the second planetary gear set P2 and to the sun gear of the third planetary gear set P3, wherein the ring gear of the fourth planetary gear set P4 is connected to the fifth shaft 5 which can be coupled to a housing G of the transmission via a third brake 05; the output shaft 2 is connected to the ring gear of the third planetary gear set P3 and to the carrier of the fourth planetary gear set P4.

According to the invention, the first clutch 13, viewed axially, can be disposed between first and the second planetary gear sets P1, P2, wherein the third clutch 18, viewed axially, can be disposed between the third and fourth planetary gear sets P3, P4.

Furthermore, the second and first brakes 03, 04 and the second clutch 36, viewed axially, are preferably disposed next to each other.

Figure 2:
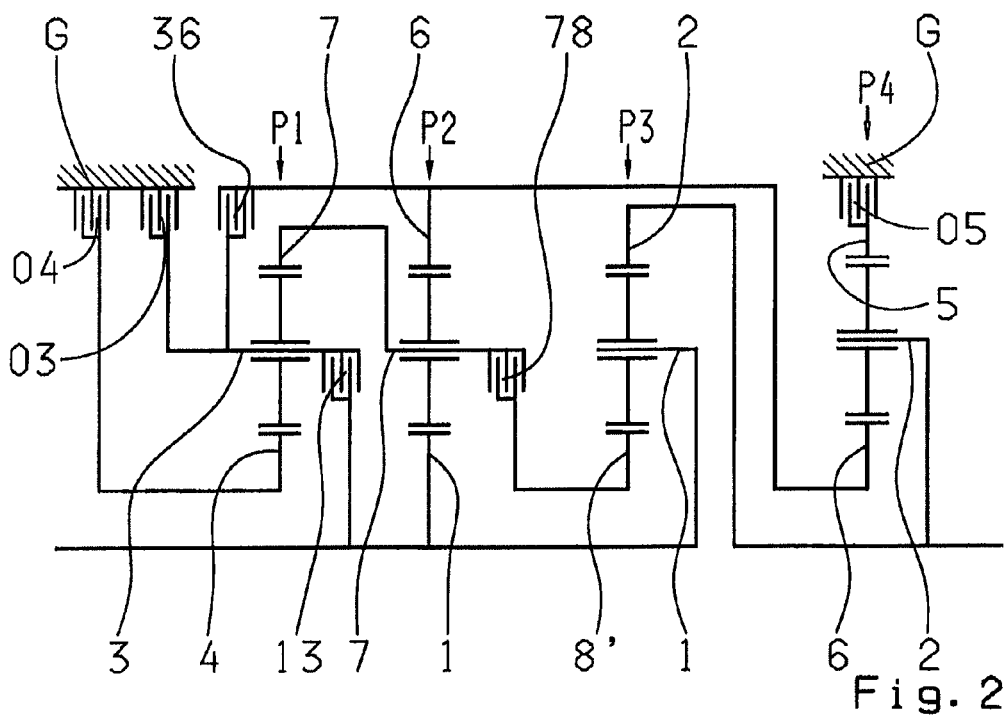
FIG. 2: a schematic view of a second preferred embodiment of a multi-step transmission according to the invention.

The embodiment shown in FIG. 2 differs from the embodiment according to FIG. 1 in that the detachable connection of the drive shaft 1 to the carrier of the third planetary gear set P3 via the third clutch 18, which detachably connects the drive shaft 1 to the eighth shaft 8 and via the eighth shaft 8 which is connected to the carrier of the third planetary shaft P3, is replaced by a direct connection of the drive shaft 1 to the carrier of the third planetary gear set P3, wherein in this case, the seventh shaft 7 cannot be detachably connected directly to the sun gear of the third planetary gear set P3, but rather via a further shaft 8' which is connected to the sun gear of the third planetary gear set P3, and via a further clutch 78 which detachably connects further shaft 8' to the seventh shaft 7.

FIG. 3 shows an example of a shift pattern of a multi-step transmission according to FIG. 1. Three shift elements are engaged for every gear. The shift pattern shows, as examples, the particular transmission ratios i of the individual gear steps, and, to be determined therefrom, the gear increments or step changes phi to the next higher gear, wherein the value 8.988 is the transmission ratio spread.

Typical values for the stationary transmission ratios of the planetary gear sets P1, P2, P3 and P4 implemented as minus planetary gear sets are −1.60, −2.228, −1.60 and −3.642, respectively. FIG. 3 shows that double shifting or group shifting is avoided when shifting sequentially since two adjacent gear steps share two shift elements. It is also shown that a large transmission ratio spread is attained with small gear increments.

The first forward gear it attained by engaging the first and third brakes 04, 05 and the second clutch 36; the second forward gear is attained by engaging the third brake 05 and the first and second clutches 13, 36; the third forward gear is attained by engaging the first and third brakes 04, 05 and the first clutch 13; the fourth forward gear is attained by engaging the third brake 05 and the first and third clutches 13, 18, the fifth forward gear is attained by engaging the first brake 04 and the first and third clutches 13, 18; the sixth forward gear, which is preferably implemented as direct drive, is attained by engaging all clutches 13, 36, 18; the seventh forward gear is attained by engaging the first brake 04 and the second and third clutches 36, 18, the eighth forward gear is attained by engaging the second brake 03 and the second and third clutches 36, 18; and the ninth forward gear is attained by engaging the first and second brakes 04, 03 and the third clutch 18, wherein the reverse gear is attained by engaging all brakes 03, 04, and 05.

Since the brakes 04 and 05 are engaged in the first forward gear and in the first reverse gear, these shift elements can be used as start-up elements.

For the case in which, according to the embodiment depicted in FIG. 2, the third clutch 18 is omitted and is replaced by the further clutch 78, i.e., for the case in which the drive shaft 1 is directly connected to the carrier of the third planetary gear set P3 instead of detachably connectable to the carrier of the third planetary gear set P3 via the eighth shaft 8 and the third clutch 18, and the seventh shaft 7 is directly connected to the sun gear of the third planetary gear set P3, but instead via a further shaft 8', which is connected to the sun gear of the third planetary gear set P3, and via a further clutch 78, which detachably connects the further shaft 8' to the seventh shaft 7, so that the third clutch 18 is replaced by the further clutch 78 in the shift pattern shown in FIG. 3.

According to the invention, different gear increments can also result from the same gear pattern depending on the shift logic, thereby making it possible to realize an application-specific or vehicle-specific variation.

According to the invention, it is possible to provide additional freewheels at each suitable location of the multi-stepd transmission, for example, between a shaft and the housing, or possibly to connect two shafts.

According to the invention, an axle differential and/or a distributor differential can be disposed on the drive side or on the output side.

Within the scope of an advantageous development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. It is also possible to dispose such a start-up element in the power flow direction after the transmission wherein, in this case, the drive shaft 1 is continuously connected to the crankshaft of the engine.

The multi-step transmission, according to the invention, also makes it possible to situate a torsional-vibration damper between the engine and the transmission.

Within the scope of a further, not represented embodiment of the invention, a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the drive shaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches.

A further advantage of the multi-step transmission presented here is that an electric machine can be attached to each shaft as a generator and/or as an additional drive machine.

Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS

1 First shaft, drive shaft
2 Second shaft, output shaft
3 Third shaft
4 Fourth shaft
5 Fifth shaft
6 Sixth shaft
7 Seventh shaft
8 Eighth shaft
8' Further shaft
03 Second brake
04 First brake
05 Third brake
13 First clutch
18 Third clutch
36 Second clutch
78 Further clutch
P1 First planetary gear set
P2 Second planetary gear set
P3 Third planetary gear set
P4 Fourth planetary gear set
i Transmission ration
phi Step change
G Housing

The invention claimed is:

1. A multi-stage transmission of a planetary design for a motor vehicle, the multi-stage transmission comprising:
an input drive shaft (1) and an output shaft (2);
first, second, third and fourth planetary gear sets (P1, P2, P3, P4) being disposed within a housing (G) of the transmission, each of the first, the second, the third and the fourth planetary gear sets (P1, P2, P3, P4) comprising a sun gear, a ring gear and a carrier;
third, fourth, fifth, sixth, seventh and eighth rotatable shafts (3, 4, 5, 6, 7, 8, 8') and at least six shift elements (03, 04, 05, 13, 18, 36, 78) comprising first, second and third brakes (04, 03, 05) and first, second and third clutches (13, 18, 78, 36) whose selective engagement produces different transmission ratios between the drive shaft (1) and the output shaft (2), such that nine forward gears and one reverse gear being realizable;
the sun gear of the first planetary gear set (P1) being connected to the fourth shaft (4) which is connectable, via the first brake (04), to the housing (G) of the transmission;
the carrier of the first planetary gear set (P1) being connected to the third shaft (3) which is one of (a) connectable to the housing (G) of the transmission via the second brake (03), (b) connectable to the drive shaft (1), via the first clutch (13), and (c) connectable to the sixth shaft (6) via the second clutch (36);
the sixth shaft (6) being connected to the ring gear of the second planetary gear set (P2) and to the sun gear of the fourth planetary gear set (P4);
the drive shaft (1) being connected to the sun gear of the second planetary gear set (P2) and is operatively connected to the carrier of the third planetary gear set (P3);
the seventh shaft (7) being connected to the ring gear of the first planetary gear set (P1) and to the carrier of the second planetary gear set (P2) and is operatively connected to the sun gear of the third planetary gear set (P3);
the ring gear of the fourth planetary gear set (P4) being connected to the fifth shaft (5) which is connectable, via the third brake (05), to the housing (G) of the transmission; and
the output shaft (2) being connected to the ring gear of the third planetary gear set (P3) and to the carrier of the fourth planetary gear set (P4).

2. The multi-stage transmission according to claim 1, wherein the eighth shaft (8) is connected to the carrier of the third planetary gear set (P3), and the drive shaft (1) is detachably connectable to the eight shaft (8), via the third clutch (18), to connect the drive shaft (1) to the carrier of the third planetary gear set (P3), and
the seventh shaft (7) is directly connected to the sun gear of the third planetary gear set (P3).

3. The multi-stage transmission according to claim 1, wherein the drive shaft (1) is directly connected to the carrier of the third planetary gear set (P3),
the eighth shaft (8') is connected to the sun gear of the third planetary gear set (P3), and
the seventh shaft (7) is detachably connectable to the eighth shaft (8') via the third clutch (78) to detachably connect the seventh shaft (7) to the eighth shaft (8').

4. The multi-stage transmission according to claim 1, wherein the first, the second, the third and the fourth planetary gear sets (P1, P2, P3, P4) are minus planetary gear sets.

5. The multi-stage transmission according to claim 2, wherein
a first forward gear is implemented by engagement of the first brake (04), the third brake (05) and the second clutch (36);
a second forward gear is implemented by engagement of the third brake (05), the first clutch (13) and the second clutch (36);
a third forward gear is implemented by engagement of the first brake (04), the third brake (05) and the first clutch (13);
a fourth forward gear is implemented by engagement of the third brake (05), the first clutch (13) and the third clutch (18);
a fifth forward gear is implemented by engagement of the first brake (04), the first clutch (13) and the third clutch (18);
a sixth forward gear is implemented by engagement of the first clutch (13), the second clutch (36) and the third clutch (18);
a seventh forward gear is implemented by engagement of the first brake (04), the second clutch (36) and the third clutch (18);
an eighth forward gear is implemented by engagement of the second brake (03), the second clutch (36) and the third clutch (18);

a ninth forward gear is implemented by engagement of the first brake (04), the second brake (03) and the third clutch (18); and the reverse gear is implemented by engagement of the first brake (04), the second brake (03) and the third brake (05).

6. The multi-stage transmission according to claim 3, wherein a first forward gear is implemented by engagement of the first brake (04), the third brake (05) and the second clutch (36);

a second forward gear is implemented by engagement of the third brake (05), the first clutch (13) and the second clutch (36);

a third forward gear is implemented by engagement of the first brake (04), the third brake (05) and the first clutch (13);

a fourth forward gear is implemented by engagement of the third brake (05), the first clutch (13) and the third clutch (78);

a fifth forward gear is implemented by engagement of the first brake (04), the first clutch (13) and the third clutch (78);

a sixth forward gear is implemented by engagement of the first clutch (13), the second clutch (36) and the third clutch (78);

a seventh forward gear is implemented by engagement of the first brake (04), the second clutch (36) and the third clutch (78);

an eighth forward gear is implemented by engagement of the second brake (03), the second clutch (36) and the third clutch (78);

a ninth forward gear is implemented by engagement of the first brake (04), the second brake (03) and the third clutch (78); and the reverse gear is implemented by engagement of the first brake (04), the second brake (03) and the third brake (05).

* * * * *